United States Patent
Raverdy et al.

(10) Patent No.: US 7,493,368 B2
(45) Date of Patent: Feb. 17, 2009

(54) SYSTEM AND METHOD FOR EFFECTIVELY PROVIDING USER INFORMATION FROM A USER DEVICE

(75) Inventors: Pierre-Guillaume Raverdy, Santa Clara, CA (US); Nigel A. J. Davies, Hala (GB); Oliver D. Storz, Sankt Georgen (DE); Christos Efstratiou, Lancaster (GB)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1090 days.

(21) Appl. No.: 09/904,394

(22) Filed: Jul. 12, 2001

(65) Prior Publication Data

US 2002/0069243 A1 Jun. 6, 2002

Related U.S. Application Data

(60) Provisional application No. 60/250,944, filed on Dec. 1, 2000, provisional application No. 60/250,947, filed on Dec. 1, 2000.

(51) Int. Cl.
*G06F 15/16* (2006.01)
*G06F 15/173* (2006.01)

(52) U.S. Cl. .................. 709/207; 709/204; 709/224

(58) Field of Classification Search .......... 709/203, 709/204, 217, 221, 225, 229, 224, 207
See application file for complete search history.

(56) References Cited

U.S. PATENT DOCUMENTS

| | | | | |
|---|---|---|---|---|
| 5,732,214 | A * | 3/1998 | Subrahmanyam | 709/227 |
| 6,343,313 | B1 * | 1/2002 | Salesky et al. | 709/204 |
| 6,363,419 | B1 * | 3/2002 | Martin et al. | 709/219 |
| 6,381,603 | B1 * | 4/2002 | Chan et al. | 707/10 |
| 6,493,751 | B1 * | 12/2002 | Tate et al. | 709/221 |
| 6,584,095 | B1 * | 6/2003 | Jacobi et al. | 370/352 |
| 6,659,861 | B1 * | 12/2003 | Faris et al. | 463/1 |
| 6,772,213 | B2 * | 8/2004 | Glorikian | 709/228 |
| 6,782,550 | B1 * | 8/2004 | Cao | 725/39 |

\* cited by examiner

*Primary Examiner*—Ario Etienne
*Assistant Examiner*—Hussein Elchanti
(74) *Attorney, Agent, or Firm*—Gregory J. Koerner; Redwood Patent Law

(57) ABSTRACT

A system and method for effectively providing user information from a user device includes an event server that provides restricted access to various types of event content information and services related to a particular event or user community. A wireless portable user device may provide an access code to the event server at a particular event location through a wireless base station that is coupled to a local area network. A system user may thereby utilize the user device to access the event server for downloading appropriate event content information and related community services. The user device may provide one or more different types of profiles and other user feedback to the event server to thereby enable the event server to effectively associate the user device with appropriate event content or other types of related community services.

33 Claims, 11 Drawing Sheets

SYSTEM AND METHOD FOR EFFECTIVELY PROVIDING USER INFORMATION FROM A USER DEVICE

CROSS-REFERENCE TO RELATED APPLICATIONS

This application relates to, and claims priority in, U.S. Provisional Patent Application Ser. No. 60/250,944, entitled "Infrastructure To Enhance User Experience At Live Events," filed on Dec. 1, 2000, and to U.S. Provisional Patent Application Ser. No. 60/250,947, entitled "Video Streaming To Personal Wireless Devices For Live Event Enhancement," filed on Dec. 1, 2000. The foregoing related applications are commonly assigned, and are hereby incorporated by reference.

BACKGROUND SECTION

1. Field of the Invention

This invention relates generally to techniques for managing information, and relates more particularly to a system and method for effectively providing user information from a user device.

2. Description of the Background Art

Implementing effective methods for effectively providing relevant information is a significant consideration for designers and manufacturers of contemporary electronic devices. However, providing information with electronic devices may create substantial challenges for system designers. For example, enhanced demands for increased device functionality and performance may require more system processing power and require additional hardware resources. An increase in processing or hardware requirements may also result in a corresponding detrimental economic impact due to increased production costs and operational inefficiencies.

Furthermore, enhanced device capability to perform various advanced operations may provide additional benefits to a system user, but may also place increased demands on the control and management of various device components. For example, an enhanced electronic device that effectively accesses, stores, displays, and manipulates digital image data for a system user may benefit from an efficient implementation because of the large amount and complexity of the digital data involved.

Due to growing demands on system resources and substantially increasing data magnitudes, it is apparent that developing new techniques for providing relevant information is a matter of concern for related electronic technologies. Therefore, for all the foregoing reasons, developing effective systems for providing information remains a significant consideration for designers, manufacturers, and users of contemporary electronic devices.

SUMMARY

In accordance with the present invention, a system and method are disclosed for effectively providing user information from a user device. In one embodiment, an electronic system may preferably include, but is not limited to, a user device, a base station, a local area network (LAN), an event server, and an Internet network. The user device may preferably be implemented as any appropriate type of electronic device. For example, the user device may be configured as a portable wireless telecommunications device.

In certain embodiments, the user device may preferably communicate bidirectionally with the base station which may include a radio-frequency transceiver system to transmit and receive wireless communications to and from the user device. The base station may preferably be coupled to the LAN which may preferably be implemented at a particular event location. For example, the LAN and the base station may be located at a movie theater, a sporting venue, or a sports bar. In certain embodiments, the electronic system may include multiple base stations coupled to one or more different LANs.

In one embodiment, the LAN may preferably communicate directly with the event server which may preferably include various types of community services or event information related to a particular user community or event location. In another embodiment, the LAN may preferably include a computer device for connecting to the Internet which may then responsively communicate with the event server. In accordance with the present invention, the user device may thus access relevant community services and information from the event server via the LAN and the base station. In certain circumstances, the user device may also communicate directly with the Internet to access the event server.

During the utilization of the foregoing embodiment, a system user may preferably utilize a profile creator from a profile module of the user device to advantageously create one or more profiles related to the system user. The foregoing profiles may include, but are not limited to a real user profile, a device profile, a network profile, a personality profile, and a character profile. The user device may preferably store the created profiles locally into a device memory. The system user may also utilize the profile creator to subsequently edit or modify any existing profiles.

Next, the system user may preferably utilize a login/configuration module of the user device to perform a login procedure for gaining restricted access to the event server. During the foregoing login procedure, the user device may preferably provide an appropriate device profile to the event server for identifying various specific configurations and functionalities of the user device. In certain embodiments, the user device may also provide an appropriate network profile to the event server. In response, the event server may preferably optimize community services and community content that is directed towards the particular system user and user device.

Following the foregoing login procedure, the system user may utilize the user device to select access to a particular community service on the event server. In accordance with the present invention, the community service may be related to a specified event location or may be directed towards a particular user community. The system user may then preferably determine whether to submit a personality profile or a character profile from the user device to the event server.

If the user device contains no personality profiles or character profiles that are appropriate for the selected community service on the event server, then the system user may utilize the user device to create an appropriate personality profile or character profile, or may alternately select a different service on the event server.

The system user may advantageously utilize a profile selector from the user device to select and send an appropriate personality profile or character profile to the event server. If the system user selects and sends an appropriate personality profile or character profile to the event server, then the system user may effectively utilize the selected community service on the event server in conjunction with a related event location or user community.

Alternately, the system user may create and send a profiles request to the event server to request various types of users information including information from various selectable profiles of other system users in the electronic system. The event server may responsively provide the requested users information and other related information from a community database or other appropriate source to the user device.

The system user may then advantageously utilize a profile analyzer from the user device to perform a profile information analysis procedure upon the requested users information. The system user may then make an informed decision to select and send an appropriate personality profile or character profile to the event server. Alternately, the system user may utilize the profile creator to create a new personality profile or character profile, or may edit an existing personality profile or character profile for transmission to the event server. The present invention thus provides an improved a system and method for effectively providing user information from a user device.

DETAILED DESCRIPTION

The present invention relates to an improvement in information management techniques. The following description is presented to enable one of ordinary skill in the art to make and use the invention and is provided in the context of a patent application and its requirements. Various modifications to the disclosed embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention comprises a system and method for effectively providing user information from a user device, and may preferably include an event server that provides restricted access to various types of event content information and services related to a particular event or user community. A wireless portable user device may provide an access code to the event server at a particular event location through a wireless base station that is coupled to a local area network.

A system user may thereby utilize the user device to access the event server for downloading appropriate event content information or other types of community services related to a particular user community. In accordance with the present invention, the user device may advantageously provide one or more different types of profiles and other types of user feedback to the event server to thereby enable the event server to effectively associate the user device with appropriate event content or other types of community services related to a particular user community.

Figure 1:
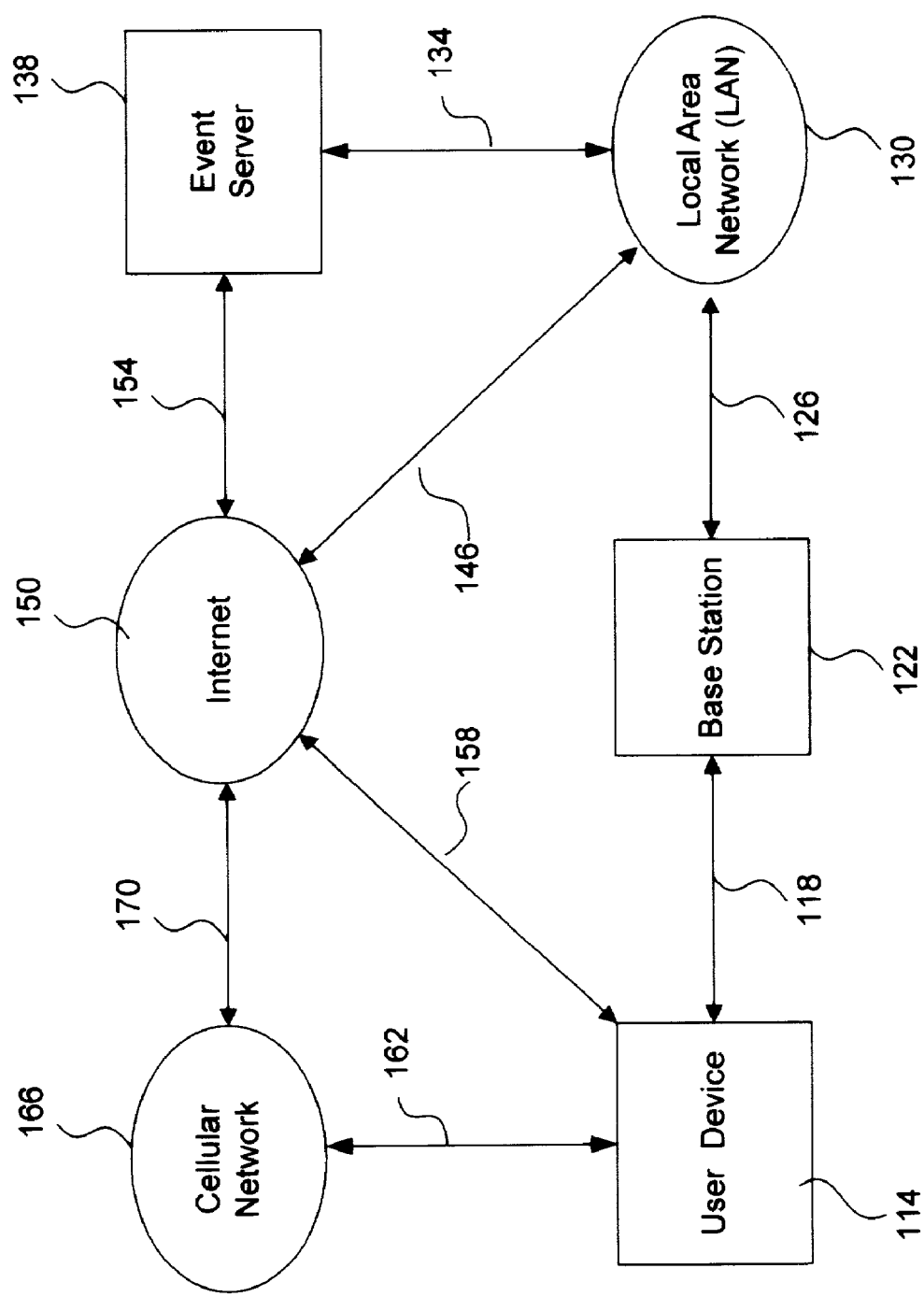
FIG. 1 is a block diagram of an electronic system, in accordance with one embodiment of the present invention.

Referring now to FIG. 1, a block diagram of an electronic system 110 is shown, in accordance with one embodiment of the present invention. In the FIG. 1 embodiment, electronic system 110 may preferably include, but is not limited to, a user device 114, a base station 122, a local area network (LAN) 130, an event server 138, an Internet network 150, and a cellular network 166. In alternate embodiments, electronic system 110 may readily be implemented using various components and configurations in addition to, or instead of, those discussed in conjunction with the FIG. 1 embodiment. For example, in certain embodiments, electronic system 110 may readily be configured to include multiple base stations 122 and/or multiple event servers 138.

In the FIG. 1 embodiment, user device 114 may preferably be implemented as any appropriate type of electronic device. For example, user device 114 may be configured as a portable wireless telecommunications device. The configuration and functionality of user device 114 is further discussed below in conjunction with FIGS. 2 and 3.

In the FIG. 1 embodiment, user device 114 may preferably communicate bidirectionally with base station 122 via path 118. Base station 122 may preferably be implemented in any appropriate manner. For example, base station 122 may include a radio-frequency transceiver system to transmit and receive wireless communications to and from user device 114. Base station 122 may preferably be coupled to LAN 130 via path 126.

In the FIG. 1 embodiment, LAN 130 may preferably be implemented at a particular event location. For example, LAN 130 and base station 122 may be located at a movie theater, a sporting venue, or a sports bar. In certain embodiments, electronic system 110 may include multiple base stations 122 coupled to one or more different LANs 130. For example, a movie theater may include an entrance LAN 130 outside the theater, a lobby LAN 130 in the theater lobby, and a screening room LAN 130 for the area in which movies are displayed.

In the FIG. 1 embodiment, LAN 130 may preferably communicate directly with event server 138 via path 134. Event server 138 may preferably include various types of event services or event information related to a particular event or event location. In certain embodiments, LAN 130 may preferably include a computer device (not shown) for connecting to Internet 150 via path 146. Internet 150 may then responsively communicate with event server 138 via path 154. The implementation and functionality of event server 138 is further discussed below in conjunction with FIGS. 5 and 6.

In accordance with the present invention, user device 114 may thus access relevant event information from event server via base station 122 and LAN 130. In certain circumstances, user device 114 may also communicate directly with Internet 150 via path 158 to access event server 138. For example, user device 114 may be utilized to access event server 138 before or after attending a particular event location. In addition, user device 114 may also communicate with cellular network 166 via path 162 to thereby access Internet 150 and event server 138 via path 170.

Figure 2:
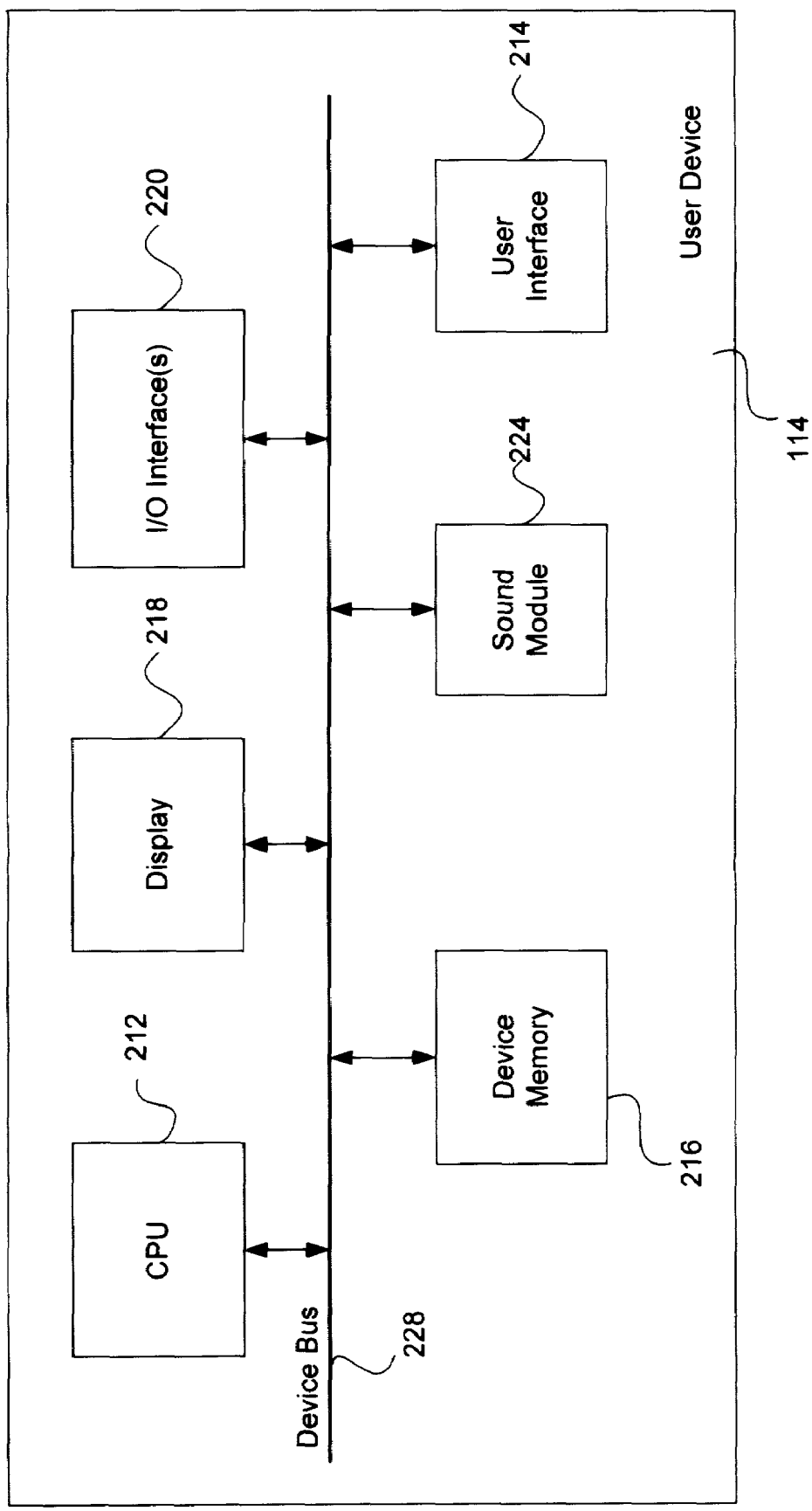
FIG. 2 is a block diagram for one embodiment of the user device of FIG. 1, in accordance with the present invention.

Referring now to FIG. 2, a block diagram for one embodiment of the FIG. 1 user device 114 is shown, in accordance with the present invention. In the FIG. 2 embodiment, user device 114 preferably includes, but is not limited to, a central processing unit (CPU) 212, a user interface 214, a device memory 216, a display 218, one or more input/output interface(s) (I/O interface(s)) 220, and a sound module 224. The foregoing components of user device 114 may preferably be coupled to, and communicate through, a device bus 228.

In alternate embodiments, user device 114 may readily be implemented using various components and configurations in addition to, or instead of, those discussed in conjunction with the FIG. 2 embodiment. In addition, user device 114 may be implemented as any desired type of electronic device. For example, in certain embodiments, user device 114 may include a personal digital assistant (PDA) device, a cellular telephone device, a computer device, or any portable electronic device that supports wireless electronic communications.

In the FIG. 2 embodiment, CPU 212 may be implemented to include any appropriate and compatible microprocessor device that preferably executes software instructions to thereby control and manage the operation of user device 114. The FIG. 2 display 218 preferably may include any effective type of display technology including a cathode-ray-tube monitor or a liquid-crystal display device.

In the FIG. 2 embodiment, I/O interface(s) 220 preferably may include one or more input and/or output interfaces to receive and/or transmit any required types of information by user device 114. For example, in the FIG. 2 embodiment, user device 114 may utilize I/O interface(s) 220 to bi-directionally communicate with various types of wireless communications devices through a wireless communications interface. The wireless communications interface may preferably include any effective means to remotely communicate with an external entity such as LAN 130 (FIG. 1) or Internet 150, to thereby exchange relevant information for successful operation of user device 114.

In addition, user device 114 may utilize the wireless communications interface to download various types of content information and other data from a wireless source such as base station 122 (FIG. 1). The foregoing wireless communications interface may be implemented using any appropriate wireless technology, including radio-frequency transmission, infrared transmission, or microwave transmission.

In the FIG. 2 embodiment, user device 114 may also utilize I/O interface(s) 220 to bi-directionally communicate with one or more distributed computer networks. For example, user device 114 may advantageously communicate with the Internet, a local area network, or other distributed computer networks to upload or download various types of information.

User device 114 may also utilize I/O interface(s) 220 to bi-directionally communicate with a host computer. For example, user device 114 may communicate with a personal computer device over a Universal Serial Bus (USB) to effectively upload or download various types of information. Similarly, in the FIG. 2 embodiment, user device 114 may utilize I/O interface(s) 220 to bi-directionally communicate with a cellular telephone network to preferably transfer any desired information.

In the FIG. 2 embodiment, one or more removable storage media interfaces may preferably be utilized to receive or send any desired data for user device 114. For example, various types of removable storage media may provide means for bi-directional transfers of content information and other data between user device 114 and other appropriate entities. In certain embodiments, the removable storage media may include memory devices to support any desired type or combination of removable storage media. For example, the removable storage media may support memory sticks, flash memory devices, compact disks, mini-disks, or floppy disks.

In the FIG. 2 embodiment, device memory 216 may be implemented to include any combination of desired storage devices, including, but not limited to, read-only memory (ROM), random-access memory (RAM), and various types of non-volatile memory, such as floppy disks or hard disks. The contents and functionality of device memory 216 are further discussed below in conjunction with FIG. 3.

Sound module 224 preferably may include appropriate interfaces to support audio functionality for user device 114. For example, in certain embodiments, sound module 224 may include, but is not limited to, an audio processing module, a power amplifier, one or more speaker devices, and a microphone device.

In the FIG. 2 embodiment, user interface 214 may preferably include any effective means to allow a system user to communicate with user device 114. For example, user interface 214 may support a keyboard device, a wireless remote control device, a speech-recognition module with corresponding microphone, a graphical user interface with touch-screen capability, or a selection button array mounted externally on user device 114. The functionality and utilization of user device 114 is further discussed below in conjunction with FIG. 9.

Figure 3:
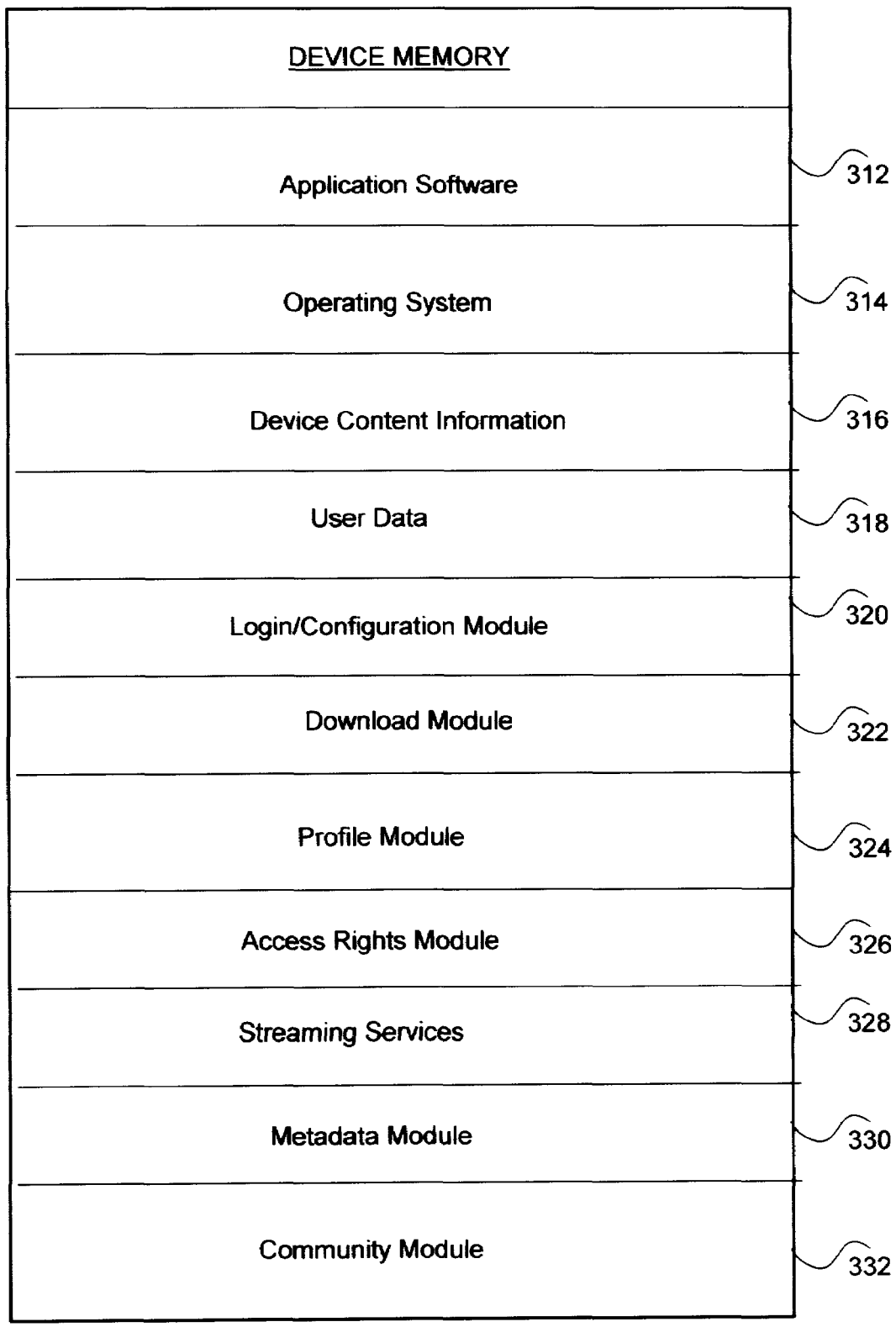
FIG. 3 is a block diagram for one embodiment of the device memory of FIG. 2, in accordance with the present invention.

Referring now to FIG. 3, a block diagram for one embodiment of the FIG. 2 device memory 216 is shown, in accordance with the present invention. In the FIG. 3 embodiment, device memory 216 preferably includes, but is not limited to, application software 312, an operating system 314, device content information 316, user data 318, a login/configuration module 320, a download module 322, a profile module 324, an access rights module 326, streaming services 328, a meta-data module 330, and a community module 332. In alternate embodiments, device memory 216 may readily include various other components in addition to, or instead of, those components discussed in conjunction with the FIG. 3 embodiment.

In the FIG. 3 embodiment, application software 312 may include program instructions that are preferably executed by CPU 212 (FIG. 2) to perform various functions and operations for user device 114. The particular nature and functionality of application software 312 preferably varies depending upon factors such as the specific type and particular use of the corresponding user device 114. In the FIG. 3 embodiment, operating system 314 preferably controls and coordinates low-level functionality of user device 114. Device content information 316 preferably includes various types of data that is preferably stored in device memory 216. Device content information 316 preferably may include various types of image data or other types of information. User data 318 may preferably include any information pertaining to the utilization of user device 114 by one or more system users. User data 318 is further discussed below in conjunction with FIG. 4.

In the FIG. 3 embodiment, login/configuration module 320 may preferably initiate bi-directional communications between user device 114 and another entity in electronic system 110. For example, login/configuration module 320 may perform a login procedure to initially connect user device 114 to event server 138 via LAN 130 or via Internet 150. In the FIG. 3 embodiment, login/configuration module 320 may preferably initially provide an access code and other user data 318 to event server 138 which may responsively send appropriate configuration information to user device 114. Login/configuration module 320 may then perform a configuration procedure by utilizing the downloaded configuration information from event server 138 to effectively configure user device 114 in an optimal manner for accessing event server 138 in conjunction with a particular event at a corresponding event location.

In the FIG. 3 embodiment, download module 322 may preferably download and install appropriate application software 312 for use at a particular event or event location. Download module 322 may also initially determine whether a version of the application software 312 already exists on user device 114, and may then perform an update procedure if the current version of application software 312 is outdated.

In the FIG. 3 embodiment, profile module 324 may preferably create, edit, analyze, select, and otherwise manage one or more profiles that may be transmitted to event server 138 during a login procedure. Profile module 324 may also maintain a list of profile recipients that have previously received one or more different profiles from profile module 324. Profiles are further discussed below in conjunction with FIGS. 4 and 10. The configuration and operation of profile module 324 is further discussed below in conjunction with FIG. 8.

In the FIG. 3 embodiment, access rights module 326 may preferably communicate with event server 138 regarding access rights of user device 114. For example, access rights module 326 may preferably receive one or more time-stamped access capabilities for various services on event server 138. Access rights module 326 may also receive an encryption key for decrypting content information that has been encrypted by event server 138 prior to transmission to user device 114. Access rights are further discussed below in conjunction with FIGS. 4 and 8.

In the FIG. 3 embodiment, streaming services 328 may preferably support receiving, processing, and displaying various types of streaming content (for example, audio or video content) from event server 138. Similarly, metadata module 330 may preferably support receiving, processing, and displaying various types of metadata information from event server 138. For example, metadata module 330 may manage and provide various types of ancillary information that is related to a particular event, such as event participant statistics or other background information.

In the FIG. 3 embodiment, community module 332 may preferably be utilized by user device 114 to communicate with a community manager and a community database on event server 138 regarding various community services provided for one or more user communities. A user community may include any group of system users that share one or more common characteristics or interests. For example, a user community may include a group of system users that frequently attend events at a particular event location. In accordance with the present invention, event server 138 may preferably create a user community based upon various profiles that are provided to event server 138 from various user devices 114 in electronic system 110. The foregoing community manager and community database are further discussed below in conjunction with FIG. 6.

Figure 4:
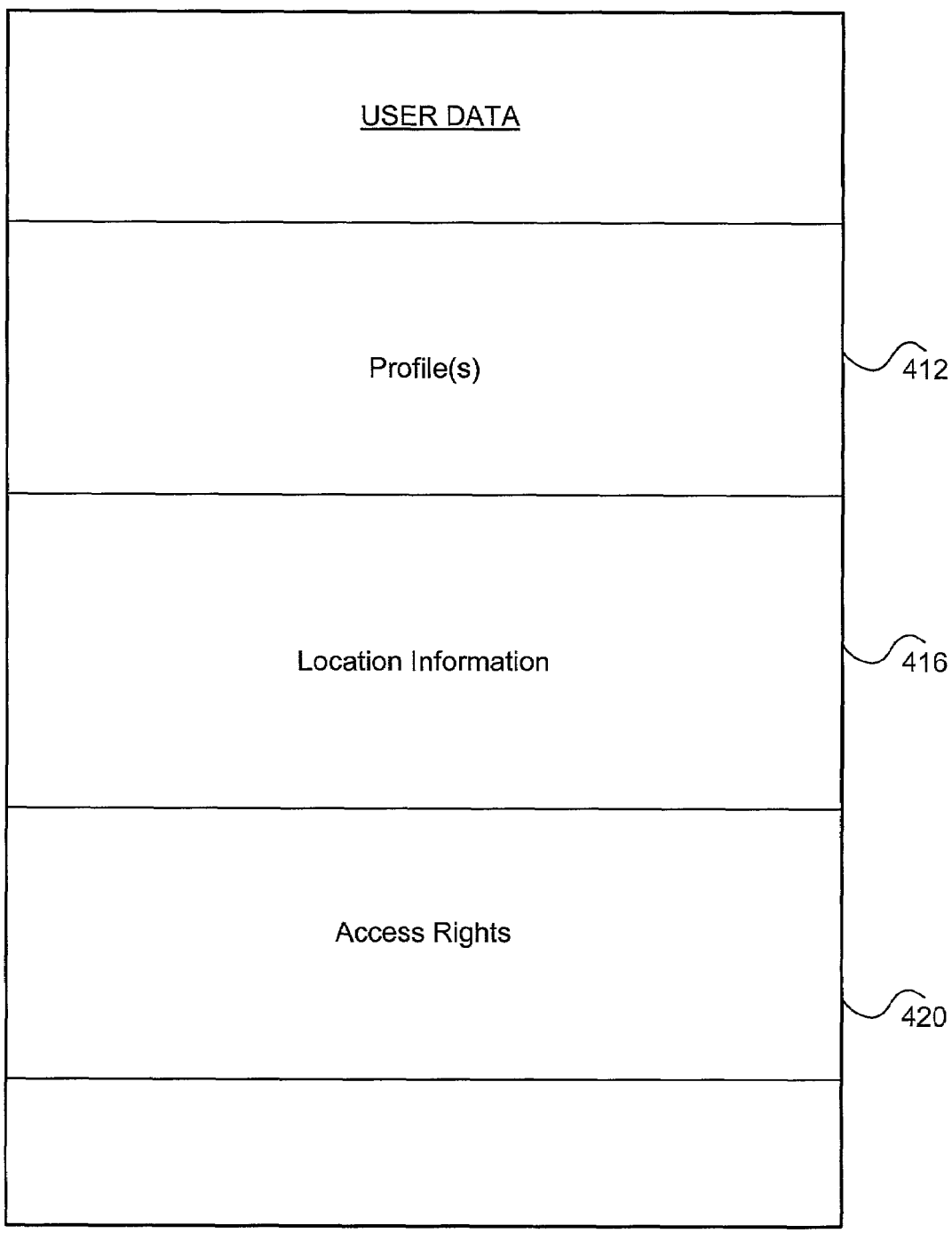
FIG. 4 is a block diagram for one embodiment of the user data of FIG. 3, in accordance with the present invention.

Referring now to FIG. 4, a block diagram for one embodiment of the FIG. 3 user data 318 is shown, in accordance with the present invention. In the FIG. 4 embodiment, user data 318 may include, but is not limited to, one or more profiles 412, location information 416, and access rights 420. In alternate embodiments, user data 318 may readily include various other components in addition to, or instead of, those components discussed in conjunction with the FIG. 4 embodiment.

In the FIG. 4 embodiment, profiles 412 may include any information related to a system user of user device 114. In certain embodiments, profiles 412 may include a basic device profile that only describes basic functionality of user device 114. The foregoing device profile may typically be provided to event server 138 to gain access by a single user device 114 to basic services and content information.

In the FIG. 4 embodiment, profiles 412 may also include one or more authentic profiles that selectively describe various personal characteristics and usage traits of a particular system user of user device 114. In accordance with the present invention, profiles 412 may also include one or more virtual profiles that selectively describe various personal characteristics and usage traits of a fictitious system user of user device 114. In the FIG. 4 embodiment, profiles 412 may also include one or more location profiles that describe a system configuration of a particular location (such as a system user's home network) to enable event server 138 to provide appropriate services and content information based upon a particular location profile.

In the FIG. 4 embodiment, location information 416 may preferably include any relevant information pertaining to one or more particular event locations. Location information 416 may be obtained in any suitable manner. For example, location information 416 may be provided by a system user by utilizing user interface 214 (FIG. 2). In accordance with the present invention, location information 416 may be provided to event server 138 in order to facilitate access to appropriate services and content information related to a corresponding event location.

In the FIG. 4 embodiment, access rights 420 may include one or more access codes for logging onto event server 138. Access codes may be obtained in any effective manner. For example, a system user may obtain an access code when purchasing admission to a particular event, and may responsively enter the access code using user interface 214. Alternately, an access code may be electronically transferred to user device 114. For example, a wireless "beaming" technique may utilize infrared or radio-frequency transmission to provide an access code to user device 114. Each of the foregoing access codes may preferably be associated with one or more time-stamped access capabilities for accessing corresponding services and content information from event server 138.

Figure 5:
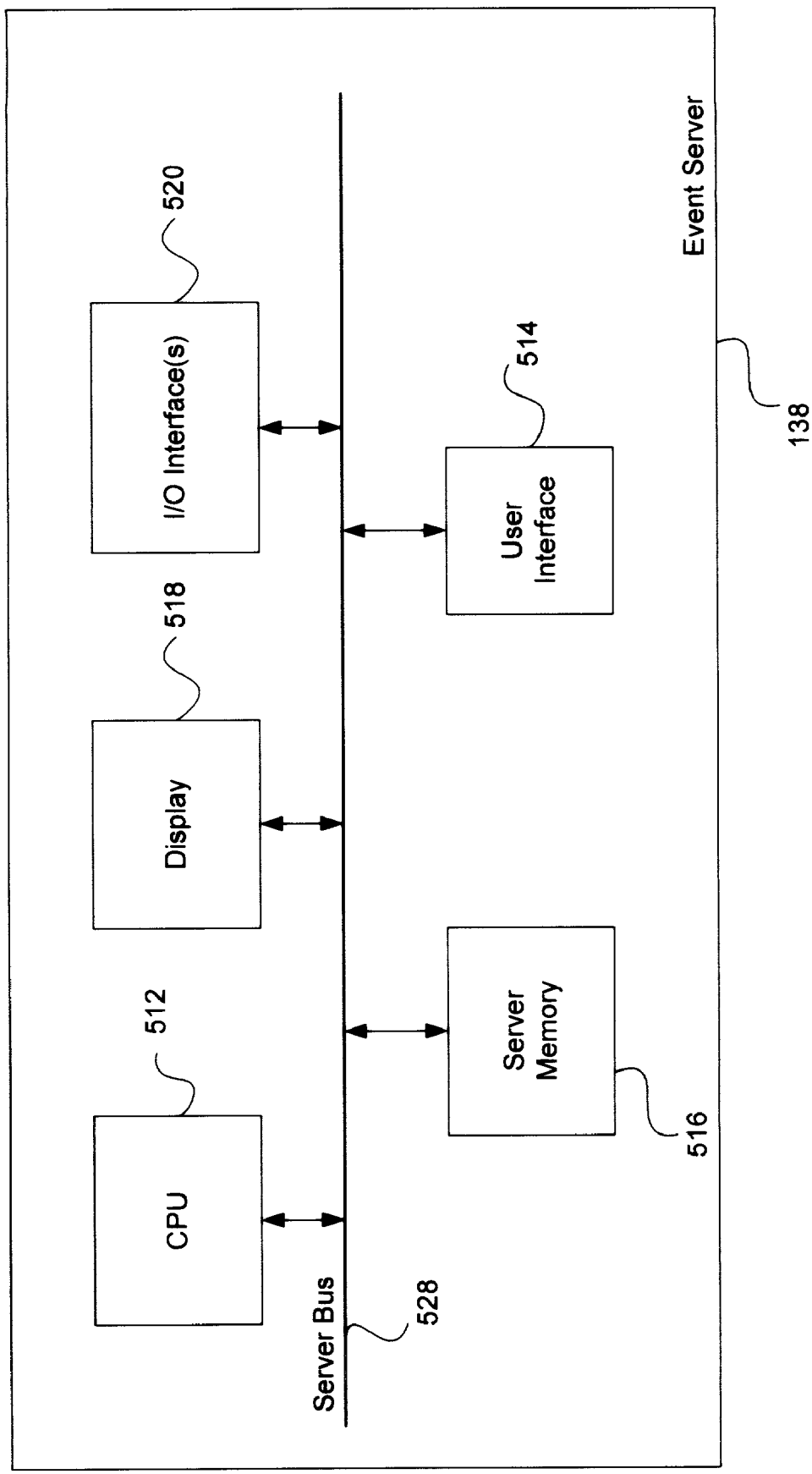
FIG. 5 is a block diagram for one embodiment of the event server of FIG. 1, in accordance with the present invention.

Referring now to FIG. 5, a block diagram for one embodiment of the FIG. 1 event server 138 is shown, in accordance with the present invention. In the FIG. 5 embodiment, event server 138 preferably includes, but is not limited to, a central processing unit (CPU) 512, a user interface 514, a server memory 516, a display 518, and one or more input/output interface(s) (I/O interface(s)) 520. The foregoing components of event server 138 may preferably be coupled to, and communicate through, a server bus 528.

In alternate embodiments, event server 138 may readily be implemented using various components and configurations in addition to, or instead of, those discussed in conjunction with the FIG. 5 embodiment. In the FIG. 5 embodiment, CPU 512 may be implemented to include any appropriate and compatible microprocessor device that preferably executes software instructions to thereby control and manage the operation of event server 138. The FIG. 5 display 518 preferably may include any effective type of display technology including a cathode-ray-tube monitor or a liquid-crystal display device.

In the FIG. 5 embodiment, I/O interface(s) 520 preferably may include one or more input and/or output interfaces to receive and/or transmit any required types of information by event server 138. For example, in the FIG. 5 embodiment, event server 138 may utilize I/O interface(s) 520 to bi-directionally communicate with various types of wireless communications devices through a wireless communications interface. The wireless communications interface may preferably include any effective means to remotely communicate with an external entity such as LAN 130 (FIG. 1) or Internet 150, to thereby exchange relevant information for successful operation of event server 138.

In addition, event server 138 may utilize the wireless communications interface to download various types of information and other data from a wireless source such as user device 114 (FIG. 1). The foregoing wireless communications interface may be implemented using any appropriate wireless technology, including radio-frequency transmission, infrared transmission, or micro-wave transmission.

In the FIG. 5 embodiment, event server 138 may also utilize I/O interface(s) 520 to bi-directionally communicate with one or more distributed computer networks. For example, event server 138 may advantageously communicate with the Internet, a local area network such as LAN 130, or other distributed computer networks to upload or download various types of information.

In the FIG. 5 embodiment, server memory 516 may be implemented to include any combination of desired storage devices, including, but not limited to, read-only memory (ROM), random-access memory (RAM), and various types of non-volatile memory, such as floppy disks or hard disks. The contents and functionality of server memory 516 are further discussed below in conjunction with FIG. 6.

In the FIG. 5 embodiment, user interface 514 may preferably include any effective means to allow a system user to communicate with event server 138. For example, user interface 514 may support a keyboard device, a display device, and/or other devices. The functionality and utilization of event server 138 is further discussed below in conjunction with FIG. 9.

Figure 6:
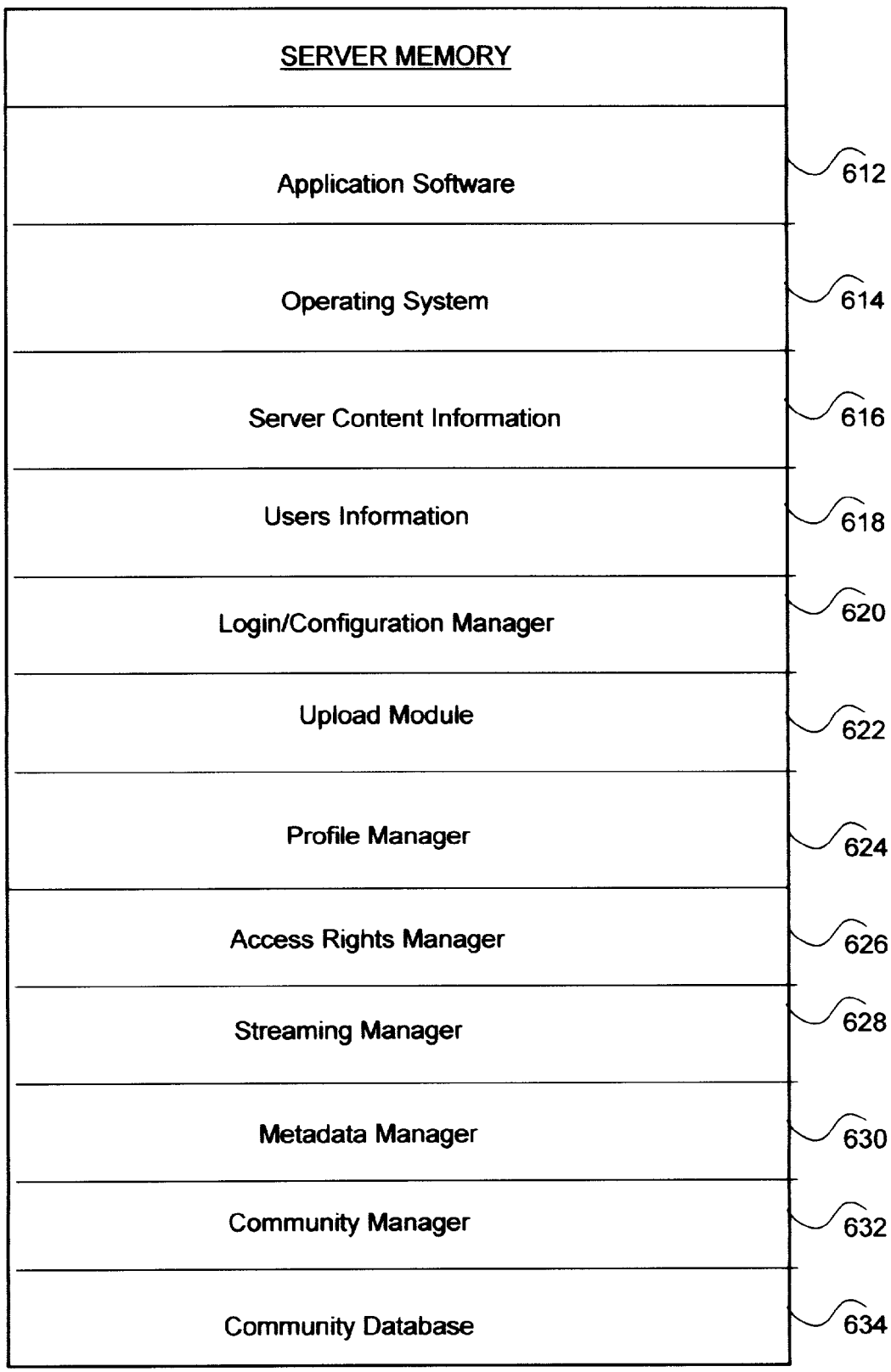
FIG. 6 is a block diagram for one embodiment of the server memory of FIG. 5, in accordance with the present invention.

Referring now to FIG. 6, a block diagram for one embodiment of the FIG. 5 server memory 516 is shown, in accordance with the present invention. In the FIG. 6 embodiment, server memory 516 preferably includes, but is not limited to, application software 612, an operating system 614, server content information 616, users information 618, a login/configuration manager 620, an upload module 622, a profile manager 624, an access rights manager 626, a streaming manager 628, a metadata manager 630, a community manager 632, and a community database 634. In alternate embodiments, server memory 516 may readily include various other components in addition to, or instead of, those components discussed in conjunction with the FIG. 6 embodiment.

In the FIG. 6 embodiment, application software 612 may include program instructions that are preferably executed by CPU 512 (FIG. 5) to perform various functions and operations for event server 138. The particular nature and functionality of application software 612 preferably varies depending upon factors such as the specific type and particular use of the corresponding event server 138. In the FIG. 6 embodiment, operating system 614 preferably controls and coordinates low-level functionality of event server 138. Server content information 616 preferably includes various types of data and services that are preferably stored in server memory 516. Users information 618 may preferably include information pertaining to various systems users. Users information 618 is further discussed below in conjunction with FIG. 7.

In the FIG. 6 embodiment, login/configuration manager 620 may preferably manage bi-directional communications between event server 138 and another entity in electronic system 110. For example, login/configuration manager 620 may participate in a login procedure to initially connect a user device 114 to event server 138 via LAN 130 or via Internet 150 (see FIG. 1). In the FIG. 6 embodiment, login/configuration manager 620 may preferably initially receive an access code and other user data 318 from a user device 114. Login/configuration manager 620 may then preferably participate in a configuration procedure by responsively providing appropriate configuration information to the particular user device 114. The user device 114 may then utilize the configuration information to effectively configure the user device 114 in an optimal manner for accessing event server 138 in conjunction with a particular event at a corresponding event location.

In the FIG. 6 embodiment, upload module 622 may preferably provide appropriate device application software 312 (FIG. 2) for use at a particular event or event location to user device 114. In the FIG. 6 embodiment, profile manager 624 may preferably manage and utilize one or more profiles 412 that may be transmitted to event server 138 during a login procedure. Profile manager 624 may also maintain a list of one or more location profiles that each correspond to a particular event location. Event server 138 may preferably utilize the location profiles in conjunction with location information 416 (FIG. 4) from a user device 114 to provide appropriate server content information to a user device 114.

In the FIG. 6 embodiment, access rights manager 626 may preferably communicate with user device 114 regarding access rights of a particular system user. For example, access rights manager 626 may preferably provide one or more time-stamped access capabilities to user device 114 for various services on event server 138. Access rights manager 626 may also provide an encryption key for decrypting content information that has been encrypted by event server 138 prior to transmission to user device 114.

In the FIG. 6 embodiment, streaming manager 628 may preferably support processing and transmitting various types of streaming video information from event server 138. Similarly, metadata manager 630 may preferably support processing and transmitting various types of metadata information from event server 138. For example, metadata manager 630 may manage and provide various types of ancillary information that is related to a particular event, such as event participant statistics or other background information.

In the FIG. 6 embodiment, as discussed above in conjunction with FIG. 3, community manager 632 may preferably be utilized by event server 138 to communicate with community modules 332 from various user devices 114 regarding community services provided by event server 138 for one or more user communities. For example, community manager 632 may create and administer one or more community databases 634 to support one or more corresponding user communities. In addition community manager 632 may support any other appropriate community services. For example, community manager 632 may manage an electronic community bulletin board/message service or an electronic community chat service/real-time discussion forum.

In the FIG. 6 embodiment, a community database 634 may include any desired community information or data relating to a particular user community. The foregoing community information may be provided from user devices 114 as a form of user feedback, or may be obtained from other appropriate sources. In accordance with the present invention, event server 138 may preferably create and manage a user community based upon various profiles that may be provided to event server 138 from various user devices 114 in electronic system 110. Configuration and utilization of profiles are further discussed in greater detail in conjunction with FIGS. 10 and 11.

Figure 7:
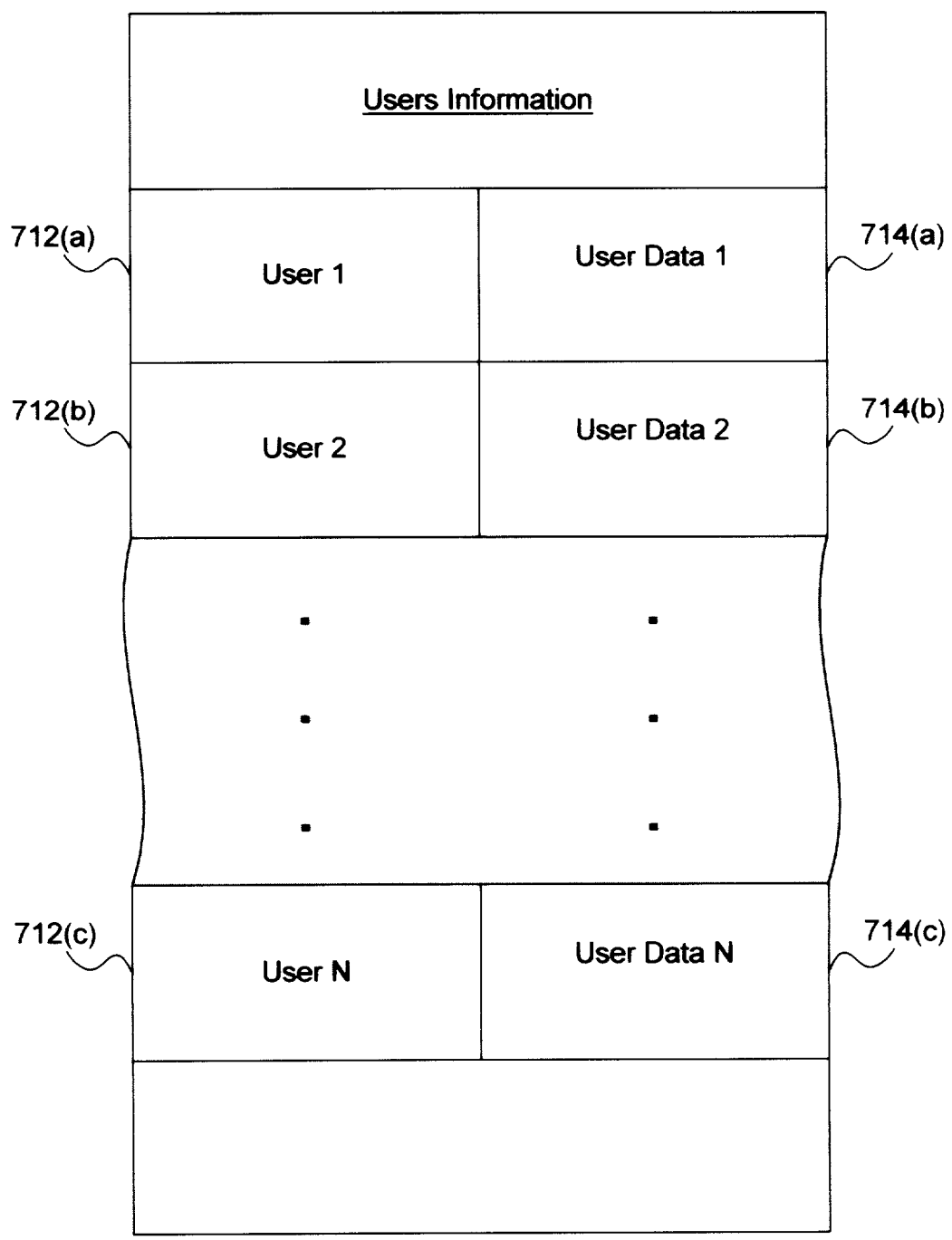
FIG. 7 is a block diagram for one embodiment of the users information of FIG. 6, in accordance with the present invention.

Referring now to FIG. 7, a block diagram for one embodiment of the FIG. 6 users information 618 is shown, in accordance with the present invention. In alternate embodiments of the present invention, users information 618 may readily be implemented to include various other configurations, and may also include various items and components that are different from those discussed in conjunction with the FIG. 7 embodiment.

In the FIG. 7 embodiment, as discussed above in conjunction with FIG. 6, event server 138 may store various sets of users information 618 that preferably may include individual sets of user data 1 (714(*a*)) through user data N (714(*c*)) which each preferably corresponds with a specific system user of a respective user device 114. In the FIG. 7 embodiment, the various system users may be identified as a respective user 1 (712(*a*)) through user N (712(*c*)). In the FIG. 7 embodiment, users information 618 may preferably include any type of information or data that may be received from any appropriate information source.

In certain embodiments, each user device 114 in electronic system 110 may provide event server 138 with various of types of user data 318 stored in the respective user devices 114 (see FIG. 4). For example, users information 618 may preferably include profiles 412, location information 416, and access rights 420 from sets of user data 318 of the various user devices 114. Event server 138 may then advantageously refer to users information 618 in order to provide appropriate services and content information to the individual user devices 114.

Figure 8:
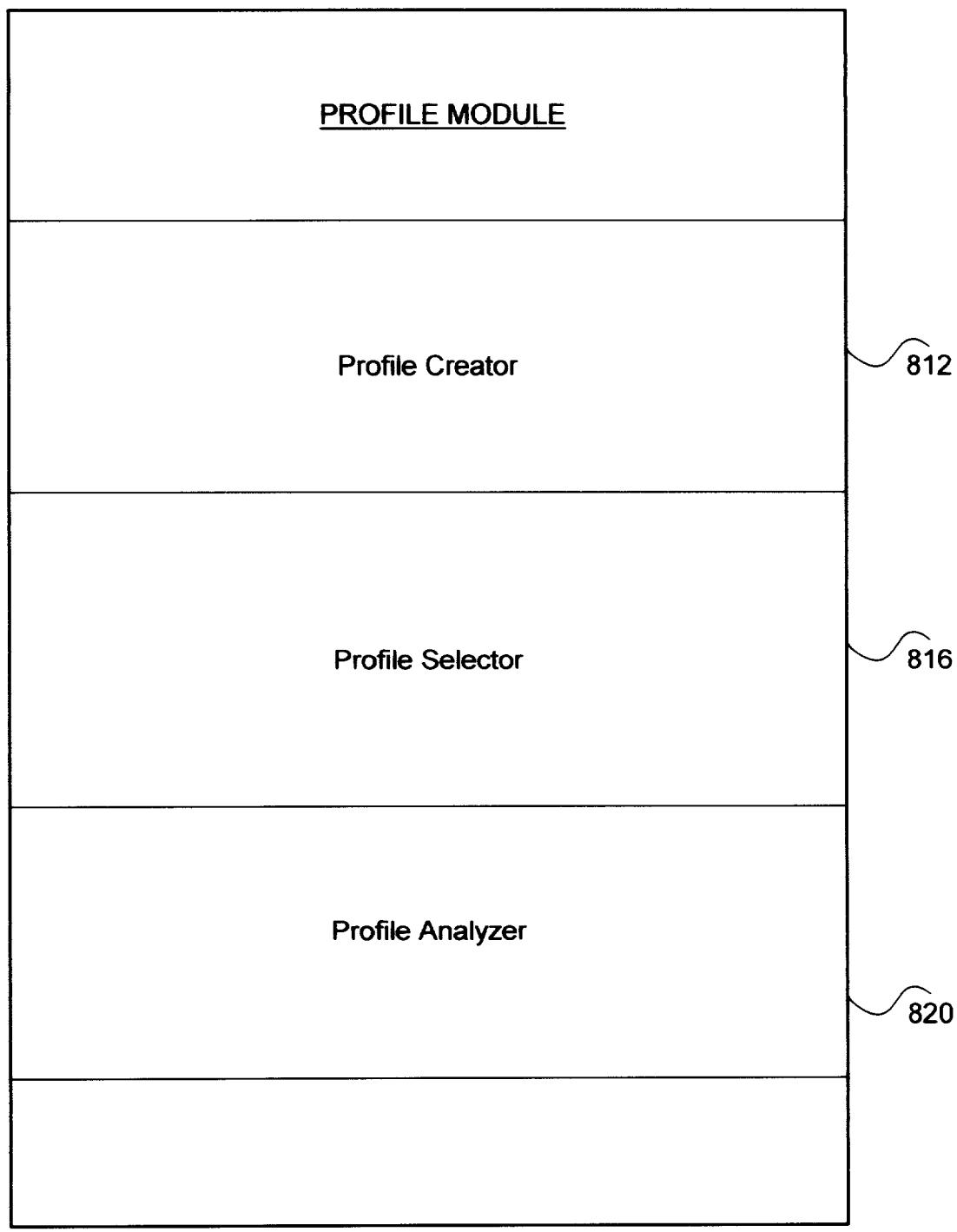
FIG. 8 is a block diagram for one embodiment of the profile module of FIG. 3, in accordance with the present invention.

Referring now to FIG. 8, a block diagram for one embodiment of the FIG. 3 profile module 324 of user device 114 is shown, in accordance with the present invention. In the FIG. 8 embodiment, profile module 324 may preferably include, but is not limited to, a profile creator 812, a profile selector 816, and a profile analyzer 820. In alternate embodiments, profile module 324 may readily be implemented using various components and configurations in addition to, or instead of, those discussed in conjunction with the FIG. 8 embodiment.

In the FIG. 8 embodiment, user device 114 may preferably utilize profile creator 812 to create and edit various types of profiles 412 and related information. In addition, user device 114 may preferably utilize profile selector 816 to choose a particular profile 412 from among several profiles 412 for transmitting to event server 138. In the FIG. 8 embodiment, profile selector 816 may also maintain a listing of various recipients of profiles 412.

User device 114 may also utilize profile analyzer 820 to access and analyze various profiles 412 from other system users in electronic system 110. For example, profile analyzer 820 may create and send a profiles request to event server 138 which may then responsively provide requested system user information and other profile information to the requesting user device 114. A system user may then utilize profile analyzer 820 to view and analyze the requested system user information and other profile information in order to make an informed decision regarding various relevant system user activities from a corresponding user device 114.

Figure 9:
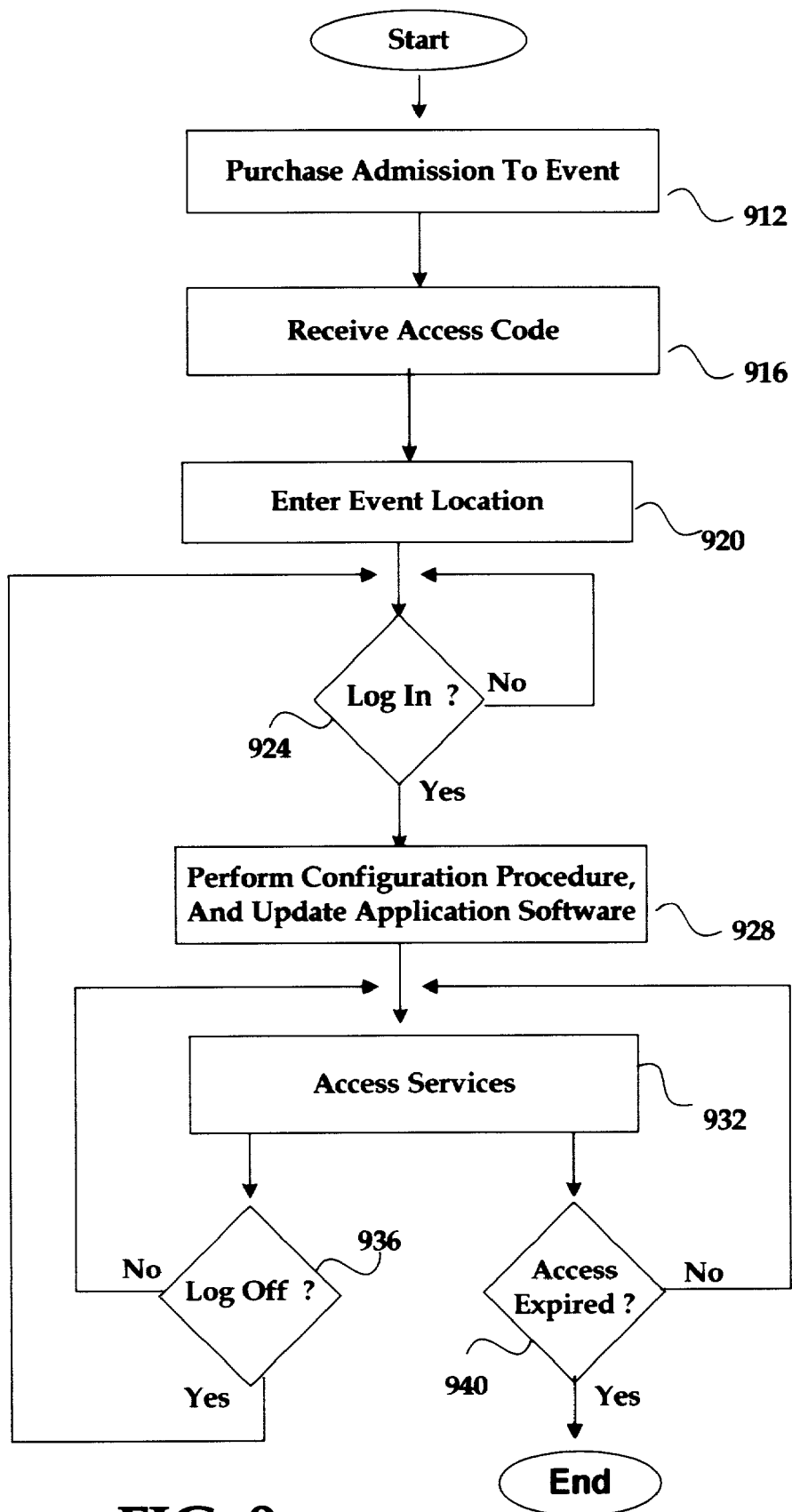
FIG. 9 is a flowchart of method steps for utilizing a user device to access an event server, in accordance with one embodiment of the present invention.

Referring now to FIG. 9, a flowchart of method steps for utilizing a user device 114 to access an event server 138 is shown, in accordance with one embodiment of the present invention. The FIG. 9 example is presented for purposes of illustration, and, in alternate embodiments, the present invention may readily utilize various other steps and sequences than those discussed in conjunction with the FIG. 9 embodiment.

In the FIG. 9 embodiment, initially, in step 912, a system user may preferably purchase an admission to a particular event or event location. Then, in step 916 the system user may preferably receive an access code corresponding to the particular event or event location. In step 920, the system user may preferably enter the event location.

Next, in step 924, the system user may preferably determine whether to perform a login procedure with user device 114 to thereby gain access to event server 138. During the login procedure, user device 114 may preferably provide the foregoing access code received in step 916 to event server 138. In certain embodiments, user device 114 may also provide other user data 318 to event server 138.

In step 928, user device 114 may preferably perform a configuration procedure with configuration information downloaded from event server 138. In addition, when appropriate, user device 114 may also update application software 312 to correspond to a latest software version for the event or event location. Then, in step 932, user device 114 may preferably access and utilize various services and content information from event server 138. In the FIG. 9 embodiment, event server 138 may preferably regulate access to various services and content information based upon time-stamped access capabilities corresponding to the access code provided by user device 114 to event server 138 during the foregoing login procedure. In certain embodiments, a system user may utilize user device 114 to provide various types of user feedback to event server 138 regarding a current event or event location. In addition, a system user may also communicate with event server 138 to perform various event-related activities such as ordering admission tickets or event notifications for future events.

In step 936, the system user may preferably determine whether to perform a logoff procedure with user device 114 to thereby terminate access to event server 138. If the system user determines to perform a logoff procedure, then the FIG. 9 process may preferably return to foregoing step 924 until the system user initiates another login procedure. Alternately, in step 940, event server 138 may periodically determine whether access rights for the user device 114 have expired. In the FIG. 9 embodiment, access rights manager 626 of event server 138 may preferably monitor the time-stamped access capabilities of access rights 420 (FIG. 4) and users information 618 (FIG. 6) to determine whether the access rights of the particular user device 114 have expired. In the FIG. 9 embodiment, when event server 138 determines that the access rights of the particular user device 114 have expired, then the FIG. 9 process may preferably terminate.

Figure 10:
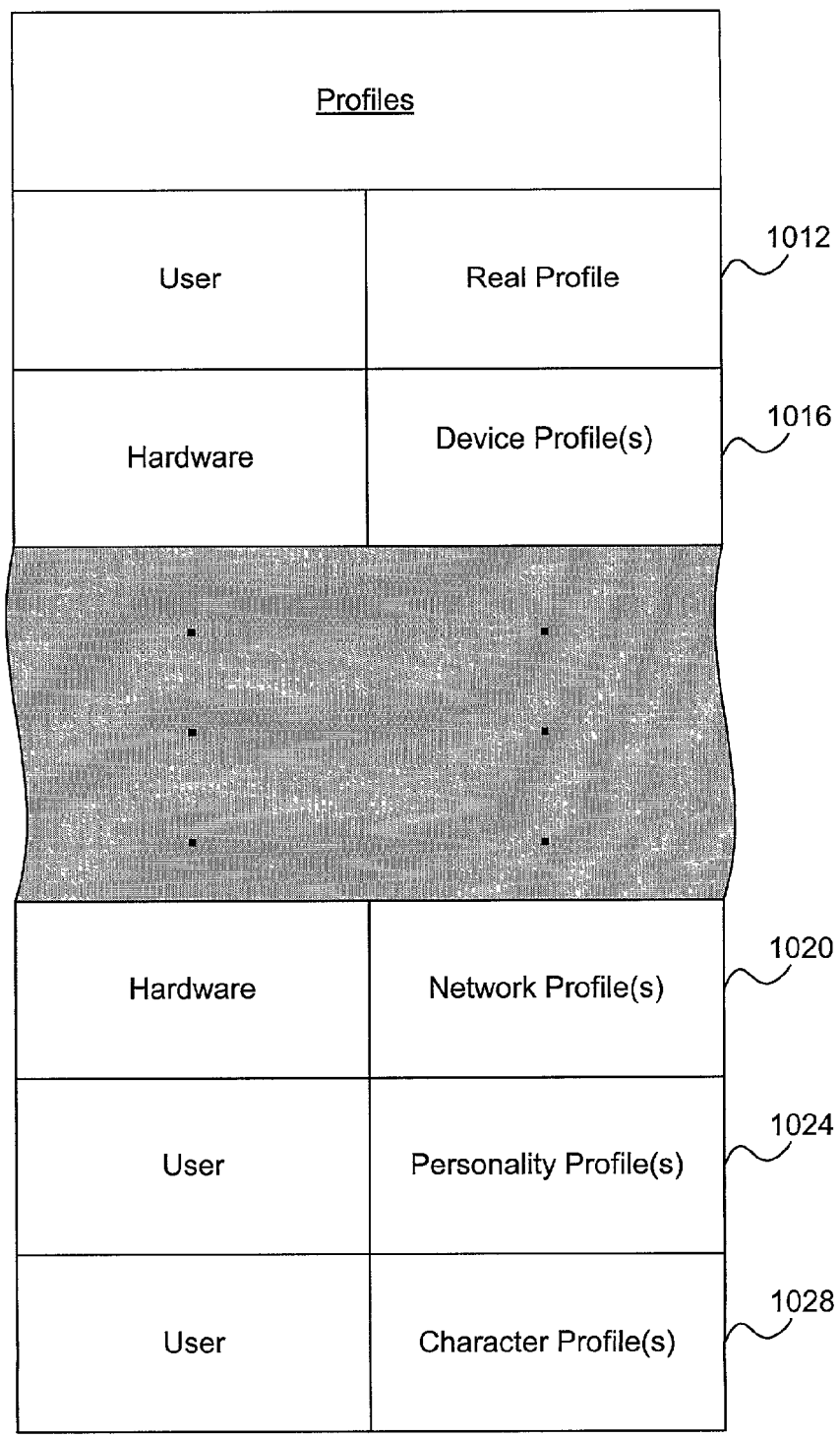
FIG. 10 is a block diagram for one embodiment of the profiles of FIG. 4, in accordance with the present invention.

Referring now to FIG. 10, a block diagram for one embodiment of the FIG. 4 profiles 412 is shown, in accordance with the present invention. In the FIG. 10 embodiment, profiles 412 may include, but are not limited to, a real profile 1012, one or more device profile(s) 1016, one or more network profile(s) 1020, one or more personality profile(s) 1024, and one or more character profile(s) 1028. In the FIG. 10 embodiment, profiles 412 may preferably be divided into various profile types. For example, each of the FIG. 10 profiles is designated as either a hardware profile type or a profile type. In alternate embodiments, profiles 412 may readily include various components and functionalities in addition to, or instead of, those discussed in conjunction with the FIG. 10 embodiment.

In the FIG. 10 embodiment, real profile 1012 may preferably include any authentic information regarding a system user of user device 114. For example, real profile 1012 may include a user name, a user mailing address, a user identification number, a user credit card number, and/or a user email address. Because of the sensitive nature of information in real profile 1012, user device 114 may preferably provide certain security safeguards to prevent inappropriate access to real profile 1012. For example, user device 114 may perform an encryption procedure before transmitting real profile 1012 to an external entity such as event server 138.

In the FIG. 10 embodiment, device profile(s) 1016 may include one or more sets of information regarding the configuration and functional capabilities of user device 114 or other electronic devices used by a system user. For example, a device profile 1016 may include communication protocols, hardware and software configurations, memory types and capacities, and data transfer speeds and formats for user device 114 or other electronic devices. User device 114 may automatically manage and update various device profiles 1016, and may typically provide an appropriate device profile 1016 to event server 138 during a login procedure to thereby permit event server 138 to optimally provide various services to the user device 114.

In the FIG. 10 embodiment, network profile(s) 1020 may include one or more sets of information regarding the configuration and functional capabilities of an electronic network system used by a system user. For example, a network profile 1020 may include communication protocols, hardware and software configurations, memory types and capacities, and data transfer speeds and formats for an electronic home network used by a system user. User device 114 or other appropriate entity may automatically manage and update a network profile 1024. User device 114 may typically provide a network profile 1020 to event server 138 whenever appropriate to thereby permit event server 138 to optimally provide various services to the user device 114 and the electronic network system.

In the FIG. 10 embodiment, personality profile(s) 1024 may include one or more sets of information regarding various selectable personal traits, interests, or other attributes of a system user of user device 114. A system user may utilize profile module 324 of user device 114 to create and edit a personality profile 1024 that is directed towards a particular user community or event location, as discussed above in conjunction with FIGS. 3 and 6. In accordance with the present invention, personality profiles 1024 may include any desired type of authentic or non-authentic information. A system user may thus create and store personality profiles 1024 that each correspond with a different user interest, user mood, or intended use of user device 114.

For example, a system user may create a personality profile 1024 that identifies the system user as being interested in events at a particular event location. At an appropriate time, user device 114 may transmit the personality profile 1024 to event server 138 to thereby identify the system user of the corresponding user device 114 as a member of the user community related to the particular event location. Community manager 632 of event server 138 may then provide various types of community-related services to the user device 114. For example, community manager 632 may allow user device 114 to access and utilize a community database 634 (FIG. 6). Having profiles 412 saved locally on a user device 114 may advantageously allow a simplified registration to multiple similarly-oriented event servers 138.

In the FIG. 10 embodiment, character profile(s) 1028 may include one or more sets of information regarding various selectable identification information of a system user of user device 114. In accordance with the present invention, character profiles 1028 may include any desired type of authentic or non-authentic identification information. For example, character profiles 1028 may include various nicknames or other personal attributes that are intended to represent a particular system user.

A system user may utilize profile module 324 of user device 114 to create and edit a character profile 1028 that is directed towards a particular use of user device 114. For example, a system user may create one or more character profiles 1028 that may then be utilized to identify the system user when user device 114 is utilized to participate in various types of computer gaming that may be supported as a service of event server 138. A system user may thus create and store character profiles 1028 to provide anonymity for the system user of user device 114. At an appropriate time, user device 114 may transmit the character profile 1028 to event server 138 to thereby temporarily identify the system user of the corresponding user device 114.

Figure 11:
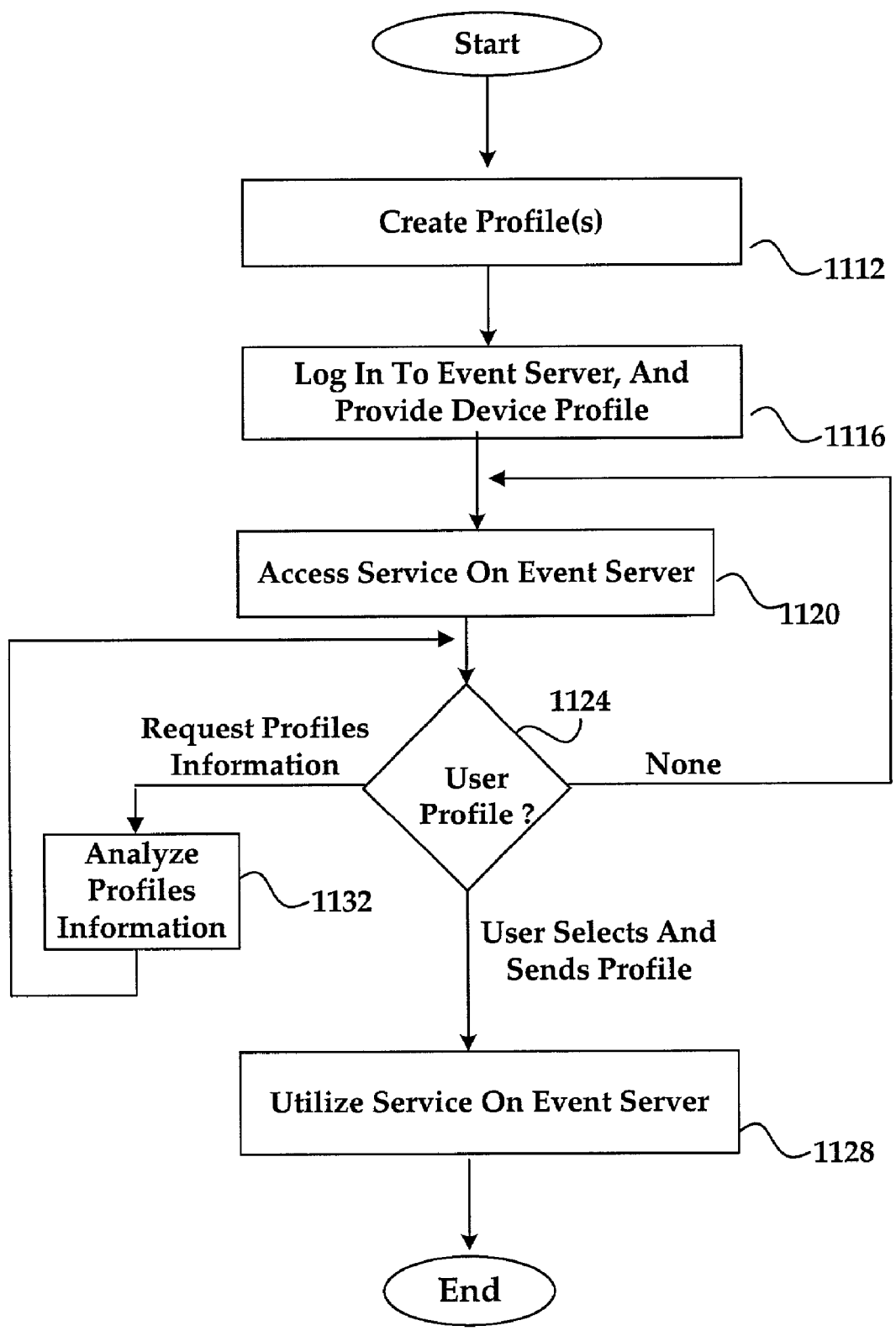
FIG. 11 is a flowchart of method steps for effectively providing user information from a user device, in accordance with one embodiment of the present invention.

Referring now to FIG. 11, a flowchart of method steps for effectively providing user information from a user device 114 is shown, in accordance with one embodiment of the present invention. The FIG. 11 example is presented for purposes of illustration, and, in alternate embodiments, the present invention may readily utilize various other steps and sequences than those discussed in conjunction with the FIG. 11 embodiment.

In the FIG. 11 embodiment, in step 1112, a system user may preferably utilize a profile creator 812 from a profile module 324 of user device 114 to advantageously create one or more profiles 412, as discussed above in conjunction with foregoing FIG. 10. User device 114 may also preferably store the created profiles 412 locally into device memory 216. In accordance with the present invention, the system user may also utilize profile creator 812 to subsequently edit or modify any existing profiles 412.

In step 1116, the system user may preferably utilize a login/configuration module 320 of user device 114 to perform a login procedure for gaining restricted access to an event server 138. In the FIG. 11 embodiment, during the foregoing login procedure, user device 114 may preferably provide an appropriate device profile 1016 to event server 138 for identifying various specific configurations and functionalities of user device 114. In certain embodiments, user device 114 may also provide an appropriate network profile 1020 to event server 138, as discussed above in conjunction with FIG. 10. In response, event server 138 may preferably optimize services and content that may be directed towards the particular user device 114.

In step 1120, following the foregoing login procedure, the system user may utilize user device 114 to select an access to a particular service on event server 138. In accordance with the present invention, the particular service may be related to a specified event location or may be directed towards a particular user community, as discussed above in conjunction with FIGS. 3, 6, and 10. In the FIG. 11 embodiment, in step 1124, the system user may then preferably determine whether to submit a user profile 1012, 1024, 1028 from user device 114 to event server 138.

In step 1124, if user device 114 contains no user profiles 1012, 1024, 1028 that are appropriate for the selected service on event server 138, then the FIG. 11 process may return to foregoing step 1120, and the system user may utilize user device 114 to create an appropriate user profile 1012, 1024, 1028, or may alternately select a different service on event server 138.

In foregoing step 1124, the system user may advantageously utilize profile selector 816 to select and send an appropriate user profile 1012, 1024, 1028 to event server 138. If the system user selects and sends an appropriate user profile 1012, 1024, 1028 to event server 138, then in step 1128, the system user may effectively utilize the selected service on event server 138 in conjunction with a related event location or user community.

Alternately, in foregoing step 1124, the system user may create and send a profiles request to event server 138 to request various types of users information 618 (FIG. 7) including information from profiles 412 of other system users in electronic system 110, as discussed above in conjunction with FIG. 8. Event server 138 may responsively provide the requested users information 618 and other related information from community database 634 to user device 114.

In step 1132, the system user may then advantageously utilize profile analyzer 820 to perform a profile information analysis procedure upon the requested users information 618. The FIG. 11 process may then preferably return to step 1124, where the system user may make an informed decision to select and send an appropriate user profile 1012, 1024, 1028 to event server 138. Alternately, the system user may utilize profile creator 812 to create a new user profile 1012, 1024, 1028, or may edit an existing user profile 1012, 1024, 1028 for transmission to event server 138. In certain embodiments, the foregoing method steps related to selecting a user profile 1012, 1024, 1028 in step 1124 may similarly be applied to selecting and sending other types of profiles 412 to event server 138, as discussed above in conjunction with FIG. 10.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A method comprising:
receiving a plurality of logon requests at a server that provides a plurality of services associated with an entertainment event, the event being at a particular location and being attended by a plurality of persons, each logon request being from a portable electronic device operated by a person physically attending the event, each logon request comprising user profile information associated with the person using the portable electronic device making the logon request, each logon request also comprising device profile information associated with the portable electronic device making the logon request;
utilizing the server for analyzing the user profiles associated with the persons using portable electronic devices logged on the server to identify at least one common user characteristic;
based on the analyzing, using the server for automatically grouping at least a portion of the persons using logged on portable electronic devices into a user community, the user community being defined by each identified common user characteristic from the user profiles;
automatically offering a particular one of the services to each person in the user community, the service offered being based on at least one of the common user characteristics that define the user community; and
receiving, during the event, from at least a portion of the portable electronic devices operated by persons in the user community, feedback information associated with the entertainment event or the offered service.

2. The method of claim 1 further comprising:
providing streaming content to a particular one of the portable electronic devices in response to receiving feedback information from the particular portable electronic device.

3. The method of claim 1, wherein the logon requests each comprise the particular location of the entertainment event.

4. The method of claim 1 wherein said event is a live event that alternately includes any of a movie theater event, a sporting venue event, or a sports bar event.

5. The method of claim 1 wherein the information includes one or more real user profiles with authentic information related to system users, the portable electronic devices enforcing a strict security protocol to protect the real user profiles, the strict security protocol including an encryption procedure to encrypt the real user profiles prior to transmitting the real user profiles.

6. The method of claim 1 wherein the information includes one or more device profiles with configuration and functionality information for the portable electronic devices, the device profiles being automatically maintained and updated by the portable electronic devices.

7. The method of claim 1 wherein the information includes one or more network profiles with configuration and functionality information for an electronic network used by the portable electronic devices, the network profiles being automatically maintained and updated by the portable user devices.

8. The method of claim 1 wherein the information includes one or more personality profiles with authentic information regarding selected personal attributes of the persons operating the portable electronic devices, the persons creating and locally storing the personality profiles by utilizing the portable electronic devices.

9. The method of claim 1 wherein the information includes one or more character profiles with non-authentic information regarding selected identification characteristics of the persons operating the portable electronic devices, the persons creating and locally storing the character profiles by utilizing the portable electronic devices, the character profiles including user nicknames.

10. The method of claim 1 wherein one or more of the persons operating the portable electronic devices create and send requests for profiles, wherein the requests for profiles request information from other users, and wherein the information from other users comprises profile information from others of the portable electronic devices.

11. A system for providing event content to a system user, comprising:
an event server receiving a plurality of logon requests that provides a plurality of services associated with an entertainment event, the event being at a particular location and being attended by a plurality of persons, each logon request being from a portable electronic device operated by a person physically attending the event, each logon request comprising user profile information associated with the person using the portable electronic device making the logon request, each logon request also comprising device profile information associated with the portable electronic device making the logon request;
the event server analyzing the user profiles associated with the persons using portable electronic devices logged on the server to identify at least one common user characteristic;
wherein based on the analyzing, using the event server for automatically grouping at least a portion of the persons using logged on portable electronic devices into a user community, the user community being defined by each identified common user characteristic from the user profiles;

said event server, automatically offering a particular one of the services to each person in the user community, the service offered being based on at least one of the common user characteristics that define the user community; and receiving, during the event, from at least a portion of the portable electronic devices operated by persons in the user community, feedback information associated with the entertainment event or the offered service.

12. The system of claim 11 wherein said event content includes restricted information that is related to said user community, a specified event, an event location, and one or more participants in said specified event, and wherein said user device is alternately implemented as any of a personal digital assistant device, a cellular telephone device, a computer device, and a portable wireless telecommunications device.

13. The system of claim 11 wherein said user device communicates with said event server through one or more wireless base station transceivers and one or more local area networks, said user device communicating with said event server through at least one of a first direct path from said one or more local area networks, an indirect path from said one or more local area networks through an Internet network, and a second direct path from said user device directly through said Internet network.

14. The system of claim 11 wherein said user device includes a processor, a display, a device memory, a sound module, one or more user interfaces, and input/output interfaces, said input/output interfaces including a wireless communications interface, a network interface, and a removable memory interface, said device memory including application software, an operating system, device content information, user data including said at least one profile, a login/configuration module, a download module for updating said application software, a profile module for managing said at least one profile, an access rights module, video streaming support services, a metadata module for managing ancillary data related to a particular event, and a community module for communicating with various community services on said event server.

15. The system of claim 11 wherein said user device includes a profile module that has a profile creator for creating and editing said at least one profile, a profile selector for choosing said at least one profile to be sent to said event server, and a profile analyzer for accessing and analyzing multiple profiles from other system users in said electronic network.

16. The system of claim 11 wherein said user device creates and locally stores user data related to said system user for sending to said event server to facilitate optimally providing said event content, said user data including said at least one profile, event location information, and access rights.

17. The system of claim 11 wherein said event server includes a processor, a display, a server memory, one or more user interfaces, and input/output interfaces, said server memory including application software, an operating system, server content information, users information including users profiles for multiple system users of multiple user devices in said electronic network, a login/configuration manager, an upload module for updating device application software, a profile manager for managing said users profiles, an access rights manager for managing said restricted access to said event content, a video streaming manager, a metadata manager, a community manager for managing community services related to said user community, and a community database containing community information related to said user community.

18. The system of claim 11 wherein said at least one profile comprises a real user profile that includes authentic information related to said system user, said user device enforcing a strict security protocol to protect said real user profile, said strict security protocol including an encryption procedure to encrypt said real user profile prior to transmitting said real user profile to said event server.

19. The system of claim 11 wherein said at least one profile comprises a device profile that includes configuration and functionality information for said user device, said device profile being automatically maintained and updated by said user device.

20. The system of claim 11 wherein said at least one profile comprises a network profile that includes configuration and functionality information for an electronic network used by said system user together with said user device, said network profile being automatically maintained and updated by one of said user device and another dedicated network entity.

21. The system of claim 11 wherein said at least one profile comprises a personality profile that includes at least one of authentic information and non-authentic information regarding selected personal attributes of said system user, said system user creating and locally storing said personality profile by utilizing said user device.

22. The system of claim 11 wherein said at least one profile comprises a character profile that includes at least one of authentic information and non-authentic information regarding selected identification characteristics of said system user, said system user creating and locally storing said character profile by utilizing said user device, said character profile including a user nickname.

23. The system of claim 11 wherein a community manager of said event server supports community services related to said user community, said community services including a community database, an electronic community message service, and a real-time electronic community discussion forum, said event server associating said system user with said user community after receiving and analyzing said at least one profile from said user device, a community module of said user device then receiving said restricted access to said community services.

24. The system of claim 11 wherein said user device creates a device profile corresponding to said user device, and wherein said system user utilizes said user device to create one or more personality profiles, said user device then storing said device profile and said one or more personality profiles into a local device memory coupled to said user device.

25. The system of claim 24 wherein said system user utilizes said user device to perform a login procedure for accessing community services related to said user community on said event server, said user device transmitting said device profile to said event server during said login procedure.

26. The system of claim 25 wherein, after said login procedure, said system user utilizes said user device to perform a service selection procedure for accessing a particular community service from said event server.

27. The system of claim 26 wherein said system user utilizes a user interface on said user device to perform a profile selection procedure for choosing and sending a selected user profile to said event server.

28. The system of claim 27 wherein said system user utilizes said user interface on said user device to alternately perform a profile creation procedure and a profile editing procedure to produce said selected user profile.

29. The system of claim 27 wherein, after said user device sends said selected user profile to said event server, said event server connects said user device to said community services, said system user then utilizing said user device to download incoming community information related to said user community from said event server, said system user also utilizing said user device to transmit outgoing community information related to said user community to said event server.

30. The system of claim 26 wherein said system user utilizes a user interface on said user device to create and send a profiles request to said event server for requesting users information including multiple profiles information from other system users in said electronic network, said event server responsively servicing said profiles request and returning said users information to said user device.

31. The system of claim 30 wherein said system user utilizes a profile analyzer of said user device to view and analyze said users information from said event server before performing an informed profile selection procedure for choosing and sending a selected user profile to said event server.

32. The system of claim 11 wherein a profile selector of said user device maintains and updates a profile recipient list of any entities that have received said at least one profile.

33. The system of claim 11 wherein said event content relates to a live sporting venue event.

* * * * *